United States Patent
Oberhauser (10) Patent No.: US 6,658,987 B1
(45) Date of Patent: Dec. 9, 2003

(54) SEALING DEVICE FOR A PISTON WHICH IS SUBJECTED TO THE ACTION OF A PRESSURE MEDIUM AND WHICH IS ARRANGED IN A WORKING CYLINDER

(75) Inventor: Ludwig Oberhauser, Unterahrain (DE)

(73) Assignee: Log Hydraulik GmbH, Unterahrain (DE)

( * ) Notice: Subject to any disclaimer, the term of this patent is extended or adjusted under 35 U.S.C. 154(b) by 0 days.

(21) Appl. No.: 09/926,569
(22) PCT Filed: Mar. 15, 2000
(86) PCT No.: PCT/EP00/02301
  § 371 (c)(1),
  (2), (4) Date: Mar. 18, 2002
(87) PCT Pub. No.: WO00/71913
  PCT Pub. Date: Nov. 30, 2000

(51) Int. Cl.[7] ............................................. F16J 15/18
(52) U.S. Cl. ................................. 92/168; 277/583
(58) Field of Search ........................ 92/168; 277/500, 277/583

(56) References Cited

U.S. PATENT DOCUMENTS

| 2,943,874 A | * | 7/1960 | Valdi et al. ............... 277/583 |
| 3,599,991 A | | 8/1971 | Combes |

FOREIGN PATENT DOCUMENTS

| DE | 24 30 573 | 1/1976 |
| DE | 26 14 263 | 10/1977 |
| DE | 33 21 084 | 12/1984 |
| DE | 35 17 137 | 11/1986 |
| DE | 198 06 882 | 7/1999 |
| EP | 0 142 236 | 5/1985 |

OTHER PUBLICATIONS

Atlas Compco TSF–07 S650 information sheets (7 pages) (date possibly Oct. 1995).
Air Turbine Tools Product Sheets for 200SV, 201SV, 202SV, 201DM (4 sheets) (effective date Jan. 1, 2002).
Dynabrade Product Sheets for "Pencil Grinder" (5 sheets) (effective date indicated as Feb. 2001).
Dynabrade Product Sheet for "Air–Powered Pencil Grinder" (2 sheets, D00.06) (date unavailable).

* cited by examiner

Primary Examiner—Edward K. Look
Assistant Examiner—Igor Kershteyn (57) ABSTRACT

A sealing device for a piston that is subjected to the action of a pressure medium and that is arranged in a working cylinder, whereby a piston rod guide is arranged in or on the working cylinder and the rod guide has annular recesses. In addition, elastic sealing rings and a guide are located in the recesses. At least one additional slot provided for accommodating an additional elastic sealing ring is configured in the rod guide or in a cylinder ring connected to the pressure chamber or working chamber, and which surrounds the piston rod in a concentric manner. In addition, a mechanism is provided in order to, if required, apply forces that are directed from the outside in a manner that is radial to the piston rod onto the additional sealing ring, so that the sealing ring is moved or deformed such that it is transferred from a non-sealing position to a sealing position.

14 Claims, 11 Drawing Sheets

SEALING DEVICE FOR A PISTON WHICH IS SUBJECTED TO THE ACTION OF A PRESSURE MEDIUM AND WHICH IS ARRANGED IN A WORKING CYLINDER

The invention relates to a sealing device for a piston subjected to a pressure medium in a working cylinder, with a piston rod guide being arranged in or at the working cylinder and said rod guide comprising annular recesses and with elastic sealing rings as well as guide means being respectively disposed in the recesses according to Patent Application 199 26 450.3.

From the German Laid Open Patent Application DT 26 14 263 a dynamically adjustable sealing and guide device for pistons and piston rods is known which comprises at least two chamber rings arranged in series in the axial direction, and at least one sealing ring of an elastic material, which is located between them.

The piston has projections and recesses formed in the longitudinal direction, which are surrounded by a guide ring. A space is left between the guide rings for the accommodation of a sealing ring. The sealing ring rests against a groove in the piston via a further elastic ring, so that a certain adjustability is given due to the elasticity of the further ring.

The guide and sealing device for a piston subjected to a pressure medium in a working cylinder according to the German Patent DE 24 30 573 C3 is intended to prevent an axial displacement of the guide rings for an optimisation of the sealing effect and for reducing wear. For this purpose, the known positive fit of groove and collar with piston seals is utilised. Thereby, the disadvantageous deformation of the guide rings is to be prevented, on the other hand, however, the sealing effect between the rings and the piston is to be increased. The pressure build-up which is required at the spreader ring is to be enabled by openings in the piston.

According to the known teaching, a compression force is introduced through the openings to act on provided inclined surfaces. The provided elastic ring deflects the pressure in an upward direction so that all further rings can be biased towards a cylinder barrel (not shown).

Messrs Hunger DFE GmbH, Würzburg, also introduced a sealing system which can be biased externally. In this rod sealing system the sealing body has an integrated pressure duct via which the seal can be additionally biased by means of a contact pressure device. For this purpose the sealing body is penetrated by a hollow needle and additional pressure medium is supplied, adjustable to a fixed value, from the biasing device into the sealing body. This is to enable the balancing of the sliding or sealing behaviour, respectively, of the sealing elements in the installed hydraulic cylinder, with the lowest seal bias required for sealing being adjustable. The bias which is influenced by wear or fatigue after an extended service period can be changed, i.e. increased via the biasing device in order to increase the service life of the sealing system. As field of application for the presented sealing system which can be externally biased, hydraulic cylinders in machines and plants such as e.g. press cylinders, rolling mill cylinders, cylinders of civil engineering hydraulics equipment and so forth are known.

The cited solution, in particular, of the sealing system which can be externally biased by Messrs Hunger DFE GmbH requires a special sealing ring with the necessary pressure duct as well as an expensive clamping device with hollow needle and pressure accumulator. Thus, the known arrangement as a whole is expensive and cannot—or at least not economically—be employed as an emergency operation or quasi standby sealing device.

It was found that for example with so-called hydraulic upper piston die presses in the repair case, an upper hydraulic oil reservoir must be completely drained upon the exchange of one of the hydraulic cylinders or hydraulic pistons, respectively. Even after draining the hydraulic reservoir residual oil in a non-negligible quantity remains in the piston volume, which must be collected during the disassembly of the respective hydraulic cylinder, which makes the work considerably more difficult. For the above described case it would be desirable to provide the possibility of additional sealing in order to be able to exchange damaged primary seals which are located in the piston rod guide. Moreover, there should be the possibility to activate additional seals over a certain period of time, in order to ensure emergency operation properties of the relevant machines and equipment which employ hydraulic cylinders.

From the aforesaid it is therefore the object of the invention to specify an advanced sealing device for a piston subjected to a pressure medium in a working cylinder, with a piston rod guide known per se being provided in the or at the working cylinder and the rod guide comprising annular recesses, as well as elastic primary sealing rings as well as guide means being located in each recess, and with the device being provided with the possibility to ensure emergency operation properties in the emergency and/or repair case without having to rely on expensive special seals or extensive constructive modifications in the hydraulic cylinder system. In addition, it is to be ensured that the applied hydraulic pressure itself provides for the activation of an emergency seal.

The object of the invention is solved by means of a sealing device according to the characteristics as defined in claim 1, with claims 13 and 14 specifying special applications of such a device. The dependent claims comprise at least suitable embodiments and developments of the teaching described in the main claim.

The basic idea of the invention is to form at least one groove in the rod guide or in a cylinder ring downstream of the pressure chamber and concentrically surrounding the piston rod for the accommodation of a further quasi elastic emergency sealing ring, and to additionally provide means with the aid of which forces acting from the outside and radially to the piston rod can be applied to same, if required, so that the sealing ring is deformed similar to a crimp seal and brought into contact with the piston rod surface so that the desired sealing effect is ensured.

The elastic ring is to be a standard ring of the most simple construction, e.g. a so-called O ring, which is economically available. Due to the fact that only relatively low requirements with respect to long-term stability are to be met by the further sealing ring it is not necessary to employ expensive special materials.

In a first embodiment of the invention the additionally provided cylinder ring is located in a circumferential recess in the rod guide and more precisely at its upper end. The cylinder ring represents a supporting part which at least partially accommodates the elastic sealing ring, but, on the other hand, enables a lateral escape of the elastic sealing ring towards the piston rod in the case of the application of a force.

The supporting part can be adjusted in the axial direction of the piston rod, thereby driving the further elastic sealing ring and pressing same against an opposite stop face, so that the desired deformation of the sealing ring and the pressing or urging against the surface of the piston rod will result.

The mentioned stop face can be part of an mounting piece for accommodating one of the piston rod guide bands so that the additional constructive expenditure is kept within reasonable limits.

For the preferred application in a hydraulic upper piston die press, a plurality of sealable supply holes is provided in the rod guide, each of which enabling the actuation of a screw bolt by means of which the supporting part can be moved towards the cylinder frame.

In the case in which the guide rod must be disassembled for exchange purposes, e.g. of the primary seals, the supporting part is first moved via the screw bolt connection towards the stop face so that the further seal moves from a rest position into a sealing position towards to piston rod. This securely seals the working chamber of the hydraulic cylinder and the rod guide can be removed. Any hydraulic oil or similar fluid remaining in the working chamber need not be removed, collected and/or disposed of so that the repair times are shortened and the repair expenditure is reduced. There is, of course, also the possibility to activate the further seal in the operating case for ensuring the emergency operation properties, by effecting a corresponding adjustment of the supporting part so that a machine equipped with such hydraulic cylinders will still be available and thus usable for at least a certain time.

In a second embodiment the groove is formed as an annular duct in the rod guide, or in third embodiment it is formed in an annular supporting part above the rod guide and connected with same. Here, the groove represents an annular duct with a depth for the complete accommodation of the further sealing ring.

A medium supply duct extends in an essentially radially outward direction form the annular duct, with the former having a medium connection at its outer end in order to urge or move, respectively, the sealing ring located in the annular duct via a suitable fluid medium from its rest position into the sealing position and vice versa and against the surface of the piston rod. For the return movement, a vacuum may be applied to the medium connection.

The above mentioned medium supply duct can be routed through the cylinder frame, with the medium connection being formed at the cylinder frame in this case. The medium connection can be a standard plug or screw connection for the supply of pressurised fluid media.

With the second and third embodiment, in particular, there is the possibility to use an elastic sealing ring which comprises a biased steel spring ring which provides the sealing ring in the unloaded condition with the tendency to move in the upward direction, i.e. away from the sealing position. When the pressure application has overcome the bias of the steel spring ring, the sealing ring is moved from the rest position into the sealing position and deformed accordingly.

The cylinder ring mentioned with the embodiments or the annular supporting part surrounds the piston rod concentrically at a distance and is mounted at or in the working cylinder together with the rod guide.

An inventive configuration provides the possibility to form the further groove an a conical annular groove, with the width of the annular groove at the piston rod near end being smaller than the width of the piston rod far end. The conical annular groove is then communicating with a duct which opens into a space including a check valve. The spring loaded check valve closes a space opening to the outside. The space opening leads into a chamber or opens into such a chamber which can be filled with hydraulic fluid under operating pressure as the pressure medium, whereby the supply of the hydraulic fluid into the chamber can be blocked via e.g. a ball valve which can be screwed into a hole.

Due to the fact that the chamber with the valve in the open position is filled with hydraulic fluid via the supply duct, a pressure is built up against the check valve under overcoming the valve closing pressure. Thus, the hydraulic fluid flows to the piston rod far end of the conical annular groove. Due to the conical configuration of the groove, the force building up towards the piston rod is high enough with the given pressure conditions to achieve a contact pressure and sealing of the further elastic sealing ring against the surface of the piston rod.

With this embodiment, the operating hydraulic pressure is utilised in order to activate the emergency operating seal in the form of an O ring, with the shape of the annular groove providing for corresponding sufficiently high pressure forces of the ring.

As explained, the pressure device, i.e. the additional sealing ring, can be accommodated in a circumferential groove of the usual rod guide in order to enable an application as an additional emergency operation seal. Hereby, the sealing ring is activated through the application of pressure in the above described manner via a medium duct with corresponding medium connection and brought into the sealing position. Specific application cases here are cylinder arrangements of devices or equipment where a sudden leakage must be bridged for a certain time in emergency cases, such as e.g. landing gears of aircraft, water barrier constructions with hydraulic actuating means, positioning machines with hydraulic cylinders and so forth.

It is principally true that in the rest position a gap remains between the additional sealing ring and the piston rod. This gap ensures that e.g. in the case of a damage of the piston rod this damage does not result in an undesired surface change of the emergency operation sealing ring because there is no contact between sealing ring and piston rod. Upon a damage of the piston rod this can be repaired, e.g. by grinding the surface, with the sealing ring being brought from the standby position into the operating position where it ensures the desired emergency operation properties. In other words, under normal operating conditions there is no surface contact between the additional sealing ring and the piston rod so that there will be no wear of the sealing ring.

The invention will be explained in detail in the following with reference to embodiments and with the aid of figures.

In the drawings

Figure 1:
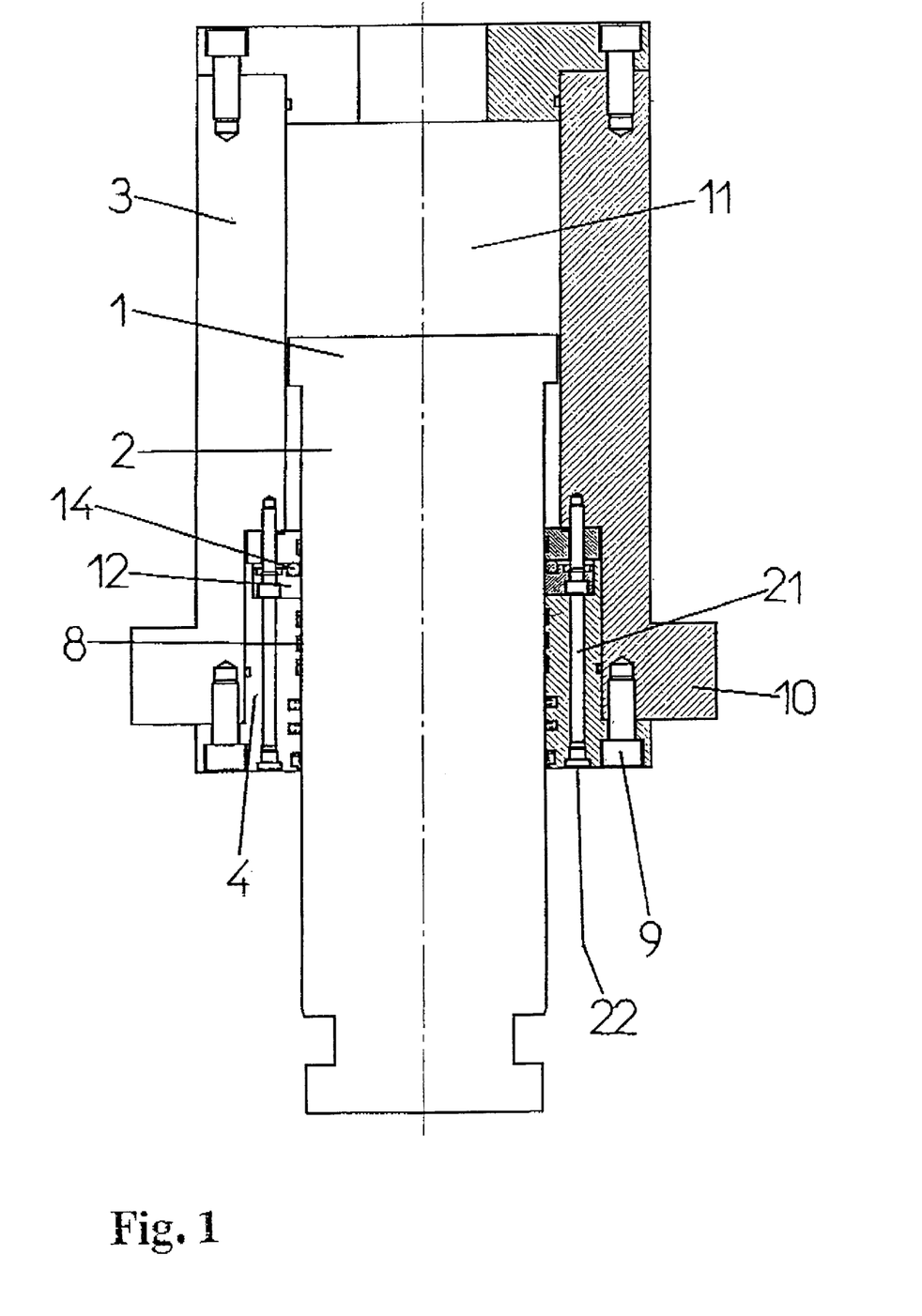
FIG. 1 shows a first embodiment with crimp seal and screw bolt.

FIG. 1 is a principal illustration of a hydraulic cylinder known per se which, according to the first embodiment of the invention, comprises a special crimp seal for ensuring emergency operation properties but also for repair purposes, i.e. for the exchange of the piston rod guide or any seals provided therefor.

The piston 1 with a piston rod 2 is arranged in a working cylinder 3 so as to be longitudinally slidable therein.

The working cylinder 3 comprises a piston rod guide 4 which has several annular recesses 5 into which elastic sealing rings 6, an oil wiper ring 7, and guide bands 8 are inserted. A screw connection 9 secures the piston rod guide 4 at the frame or at a circumferential flange 10, respectively, provided at the working cylinder 3.

In the case where due to leakages the piston rod guide 4 has to be replaced with known hydraulic cylinders, it is initially required to remove hydraulic oil from an oil reservoir (not shown) and to simultaneously provide for the evacuation of residual hydraulic oil from the working chamber 11. It was found, however, that such a removal cannot be done thoroughly enough or only with increased efforts, respectively, with the consequence that with the piston rod guide 4 disassembly and upon removal of the piston with the piston rod 1; 2 oil will escape which is a problem in particular with hydraulic upper piston die presses, for example.

Figure 2:
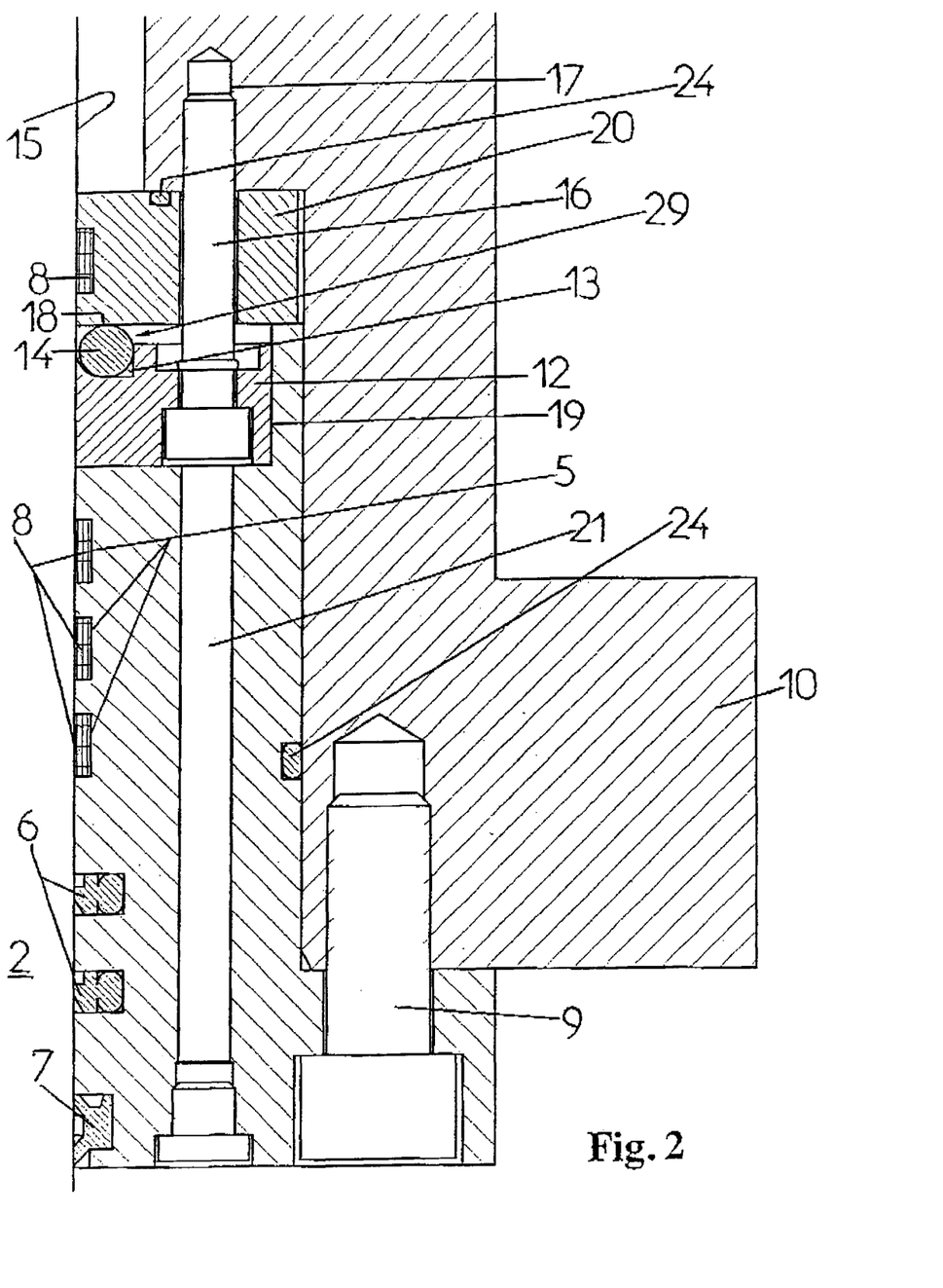
FIG. 2 shows a detailed illustration of the construction of the sealing device according to FIG. 1.

In order to counteract this problem, it is now proposed to provide a concentric cylinder ring above the piston rod guide 4 as a supporting part, with the concentric cylinder ring 12 or the supporting part, respectively, comprising a groove 13 for the accommodation of a further quasi standby sealing ring 14. As can be seen in FIG. 2, the further elastic sealing ring is principally in a rest position, i.e. there is not surface contact between the sealing ring 14 and the surface 15 of the piston rod 2 so that after a remedied damage of the piston rod a satisfactory undamaged emergency seal is available.

FIG. 2 also shows how the supporting part 12 can be moved in the longitudinal direction to a stop face 18 by means of screw bolts 16 and corresponding threaded holes 17 in the working cylinder 3.

Through this movement, a deformation of the elastic sealing ring 14 and a contact of the latter with the surface 15 of the piston rod 2 take place so that a desired sealing effect is attained.

Thus the concentric cylinder 12 or the supporting part, respectively, together with screw bolts 16 and threaded holes 17 serves for exerting a force on the elastic sealing ring 14 in order to bring same from the normal, i.e. rest position 29, into a sealing position.

At this point it should be noted that the concentric cylinder ring 12 is seated in a circumferential recess 16 in the rod guide 4 so that a common assembly of piston rod guide 4, concentric cylinder ring 12, and the upper part of the rod guide which forms the stop face 18 is possible. The upper part of the rod guide can be designed as a mounting piece for the accommodation of one or several guide means 8.

The piston rod guide 4 comprises several access holes 21, each of which can be sealed by means of a plug 22. After removal of the plug 22 a tool can be inserted through the access hole 21 to the screw bolt 16 in order to achieve the adjustment of the supporting part as described. It is understood that the concentric cylinder ring or the concentric supporting part 12, respectively, comprises corresponding holes which are distributed circumferentially for the accommodation of the respective screw bolts 16 and that equally spaced threaded holes 17 are formed in the working cylinder 3.

Figure 3:
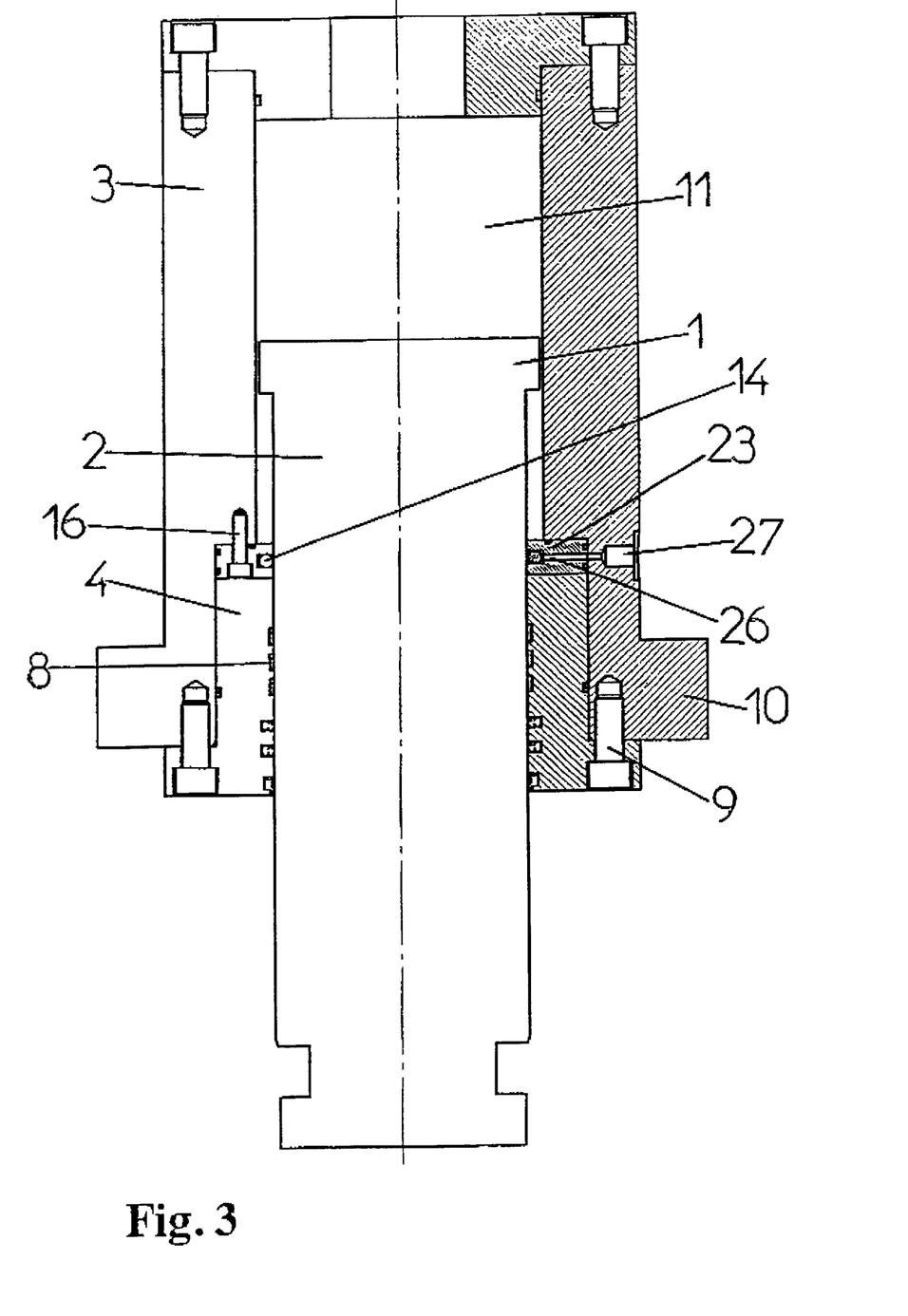
FIG. 3 shows a second embodiment with a further sealing ring which is movable or deformable, respectively, by a fluid medium.
Figure 4:
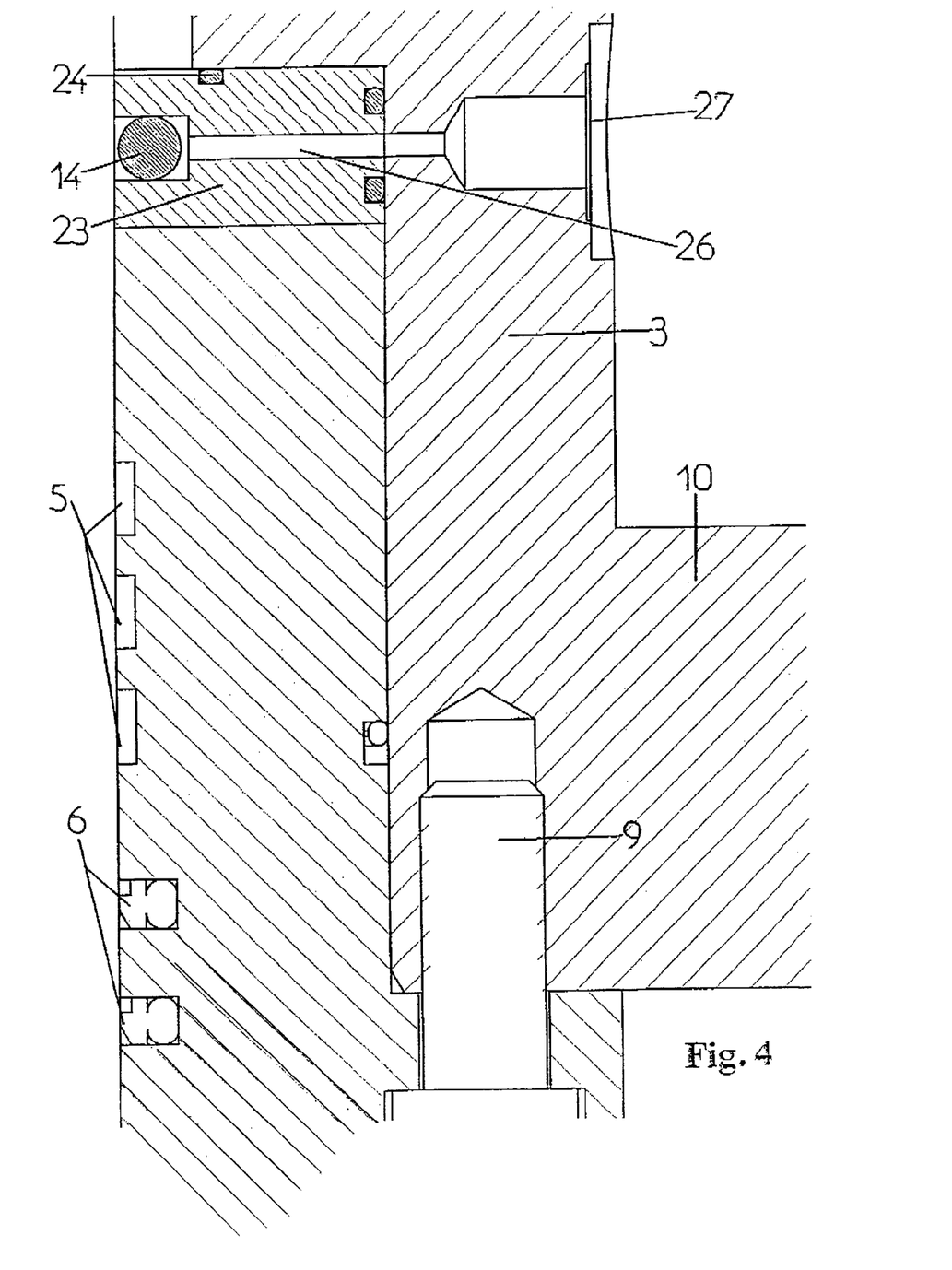
FIG. 4 shows a detailed illustration of the embodiment according to FIG. 3.

In the further embodiment according to FIGS. 3 and 4 an annular supporting part 23 is provided above the rod guide 4. The annular supporting part 23 is secured together with the screw connection 9, which ensures sealing by means of the sealing elements 24.

The annular supporting part 23 has an integrated annular duct 25 with a depth for the complete accommodation of the elastic sealing ring 14.

A medium supply duct 26 extends essentially radially outwards from the annular duct 25, which on the outside terminates in a medium connection 27 which can be designed as a plug or hose connection.

A fluid medium can reach the annular duct 25 via the medium connection 27 and the medium supply duct 26, with the consequence that the elastic sealing ring 14 moves towards the surface 15 of the piston rod and is brought from its rest position 29 into the desired sealing position.

As far as the remaining functions and elements are concerned reference is made to the above description of FIGS. 1 and 2, with the same elements being designated by identical reference numerals.

Figure 5:
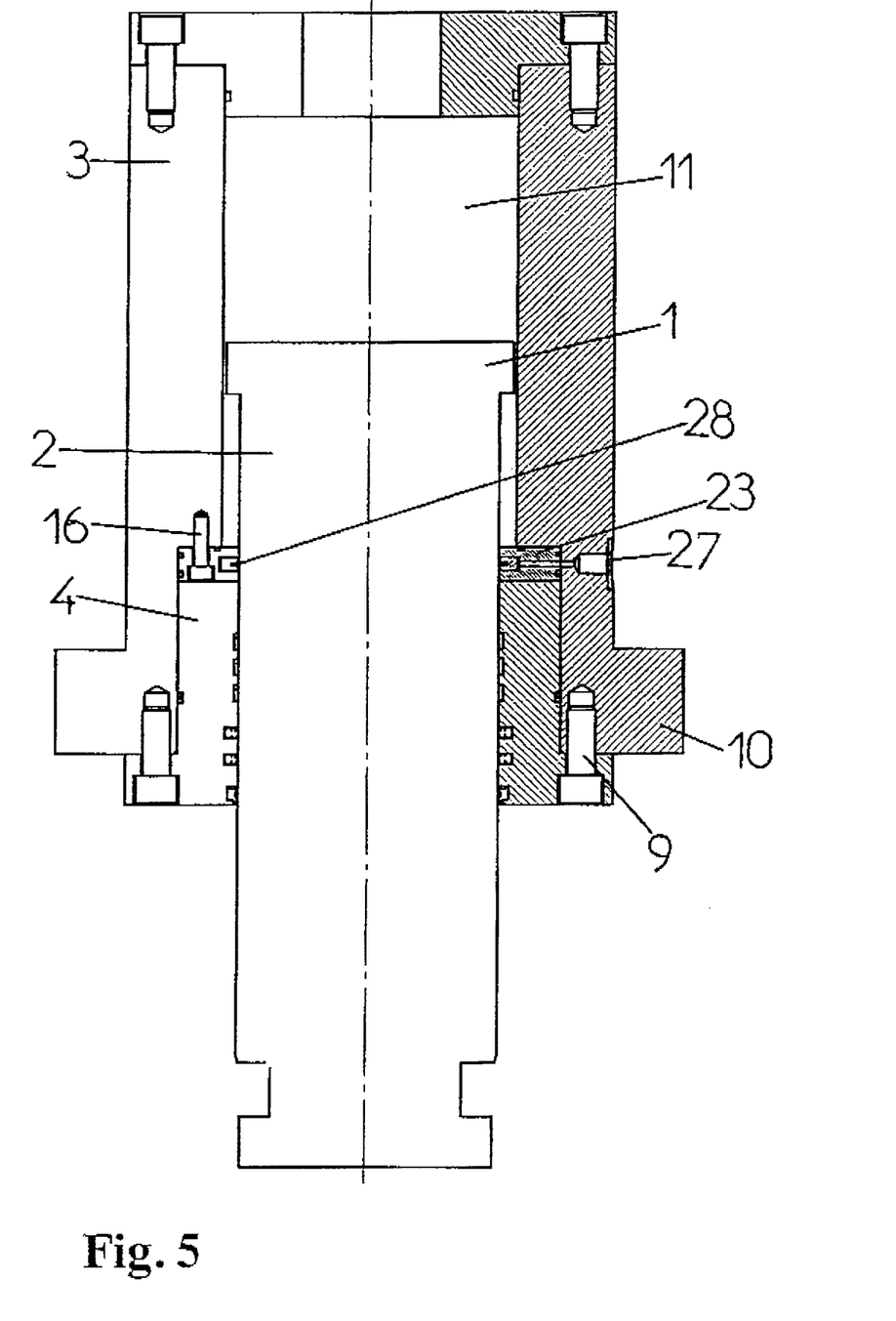
FIG. 5 shows a third embodiment similar to the one illustrated in FIG. 3, but with a sealing ring which comprises a steel spring insert.
Figure 6:
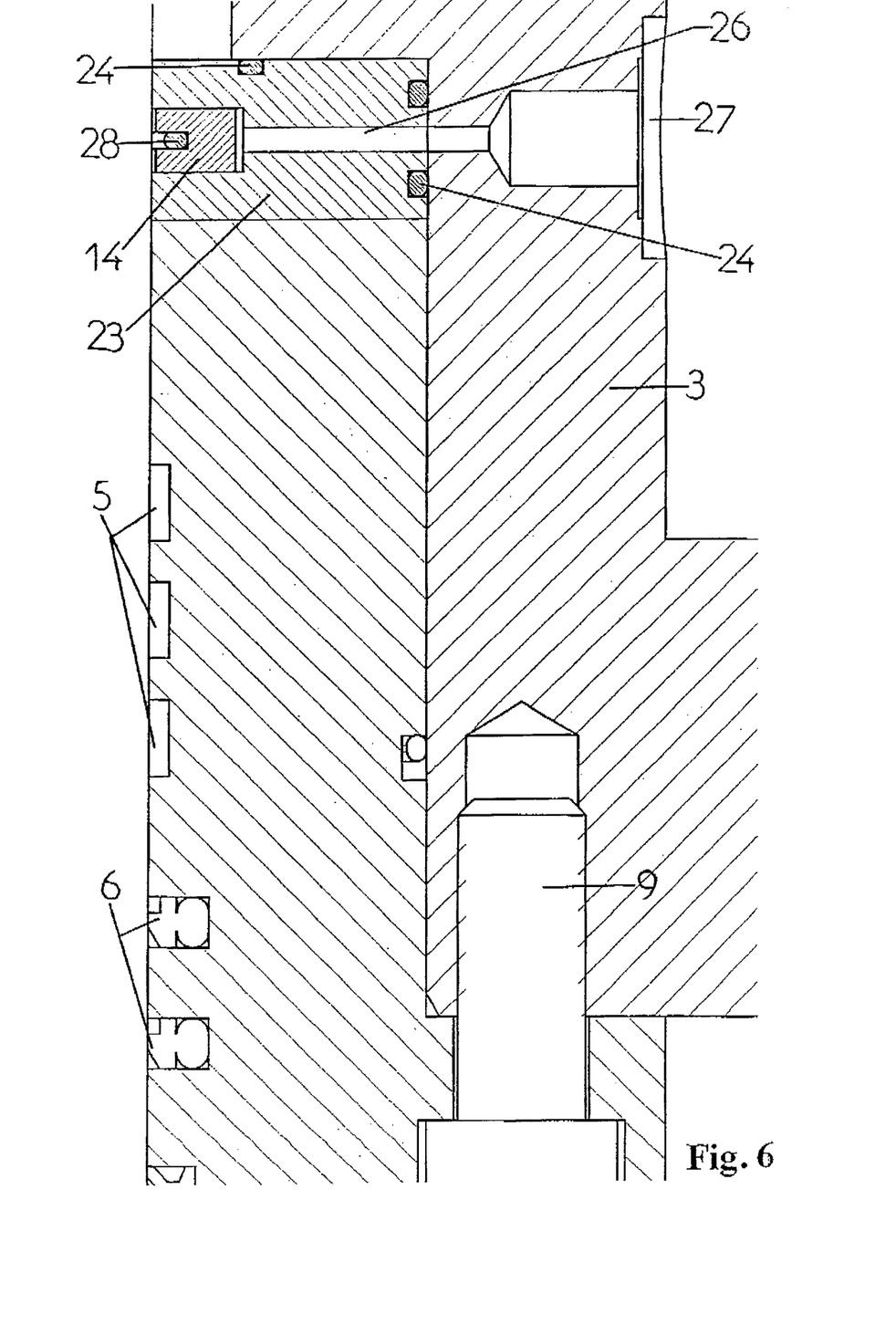
FIG. 6 shows a detailed illustration of the device according to FIG. 5.

In the further embodiment according to FIGS. 5 and 6 another annular supporting part 23 is employed which is arranged above the rod guide 4, with a medium supply duct 26 being formed in the annular supporting part 23, which leads through the wall of the working cylinder 3 to the medium connection 27. Contrary to the embodiment according to FIGS. 3 and 4, however, the elastic sealing ring 14 is provided with a biased steel spring ring 28, as can best be seen from FIG. 6.

The steel spring ring 28 biases the sealing ring 14 in a radially outward direction.

Upon the supply of a medium via the medium connection 27, i.e. with the pressure application of the seal 14 with the steel spring ring 28, the bias of the steel spring ring is overcome and the seal moves towards the surface 15 of the piston rod 2 with the desired sealing effect. A rebouncing of the steel spring ring 28 with the consequence of a corresponding movement of the sealing ring 14 can be realised by the application of a vacuum via the medium connection 27.

Figure 7:
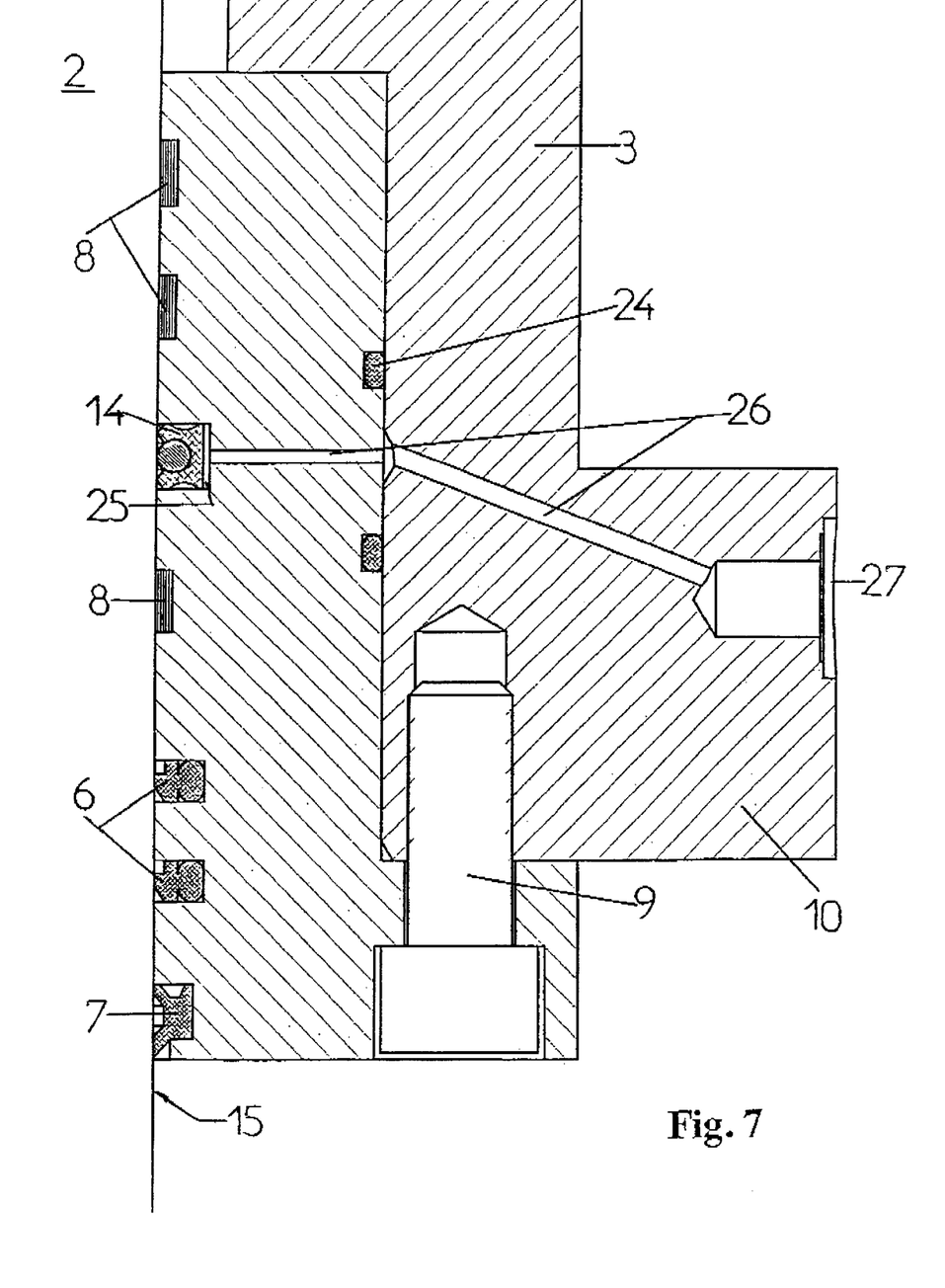
FIG. 7 shows another partial illustration of an embodiment with an additional emergency operation sealing ring in a duct of the rod guide.

The embodiment according to FIG. 7 is based on an additional quasi emergency operation seal which is located in an annular duct 25 in the rod guide 4. As explained, this seal serves for ensuring an extra emergency operation in cases where sudden leakages of the primary seals occur.

For this purpose, a medium supply duct 26 is provided which extends through the rod guide 4, leads into an extension in the shell of the working cylinder 3, and terminates in the medium connection 27. The functions for activating the additional elastic sealing ring 14 correspond to those described in conjunction with FIGS. 3 to 6. It is advantageous that standard O rings can be used for the additional elastic sealing rings 14, i.e. that not special seals are required. This makes it possible to provide the respective hydraulic cylinder in a particularly economical manner with emergency operation and repair sealing properties so that the reliability of equipment and machines provided with such hydraulic cylinders is increased.

Figure 8:
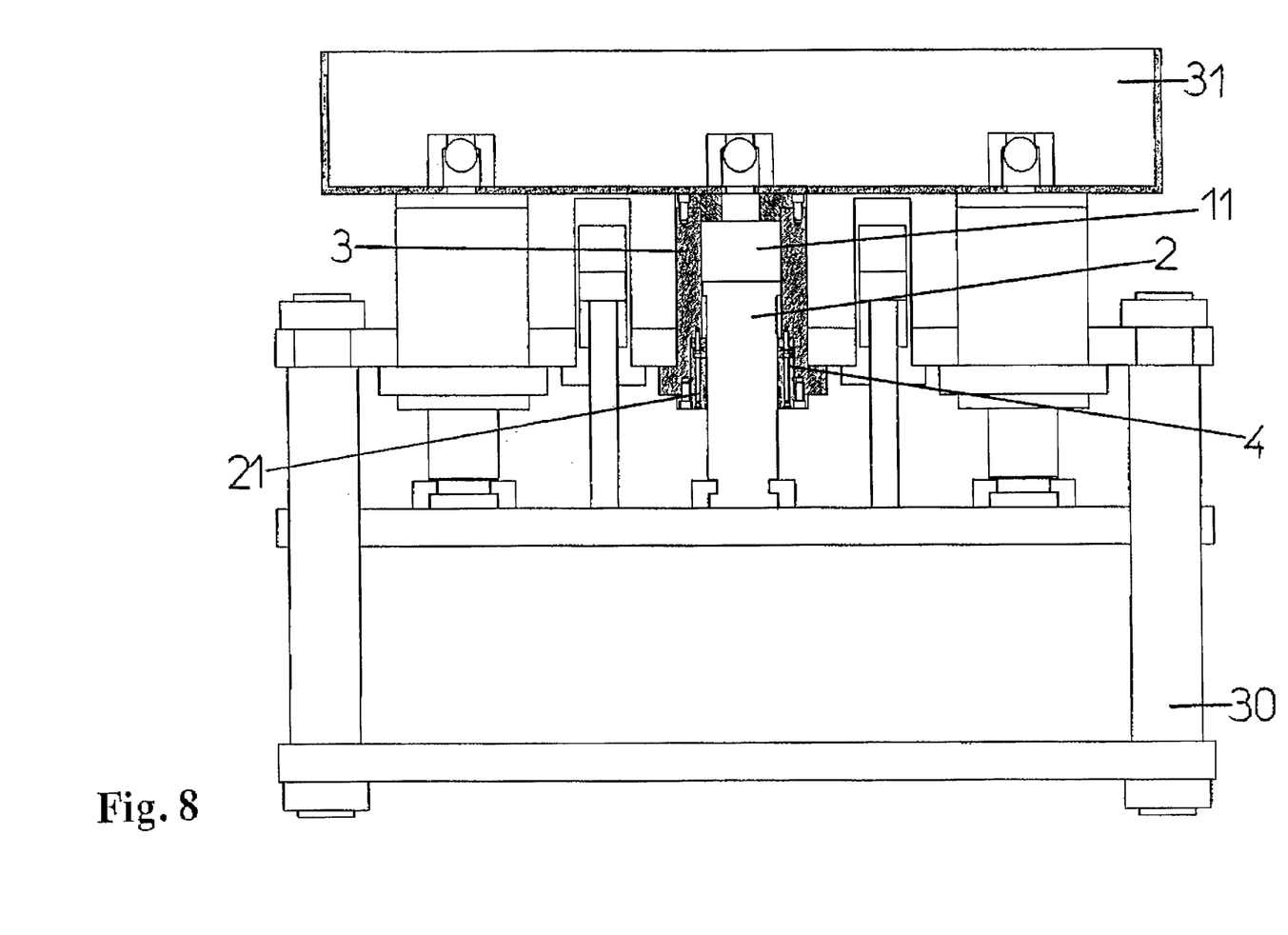
FIG. 8 shows an embodiment of a hydraulic upper piston die press with the sealing device according to the first embodiment.

A special employment of the inventive sealing device for hydraulic cylinders is shown in the principal illustration of a hydraulic upper piston die press according to FIG. 8.

Therein, three hydraulic cylinders connected in parallel are arranged in a press frame 30, with an oil reservoir 31 being located above the press frame 30.

In the case in which, for example, an exchange of the piston rod guide 4 becomes necessary because of leakages, there is the possibility to activate the additional seal in the respective cylinder in the manner disclosed according to FIGS. 1 and 2, without having to drain the oil reservoir 31 and the working chamber 11. With respect to the assembly, easy accessibility of the screw bolts 16 (see FIG. 2) is ensured via the sealable access holes 21.

An embodiment of the inventive sealing device which utilises a conical sealing groove 131 will be explained with reference to FIG. 9 to 11.

Figure 9:
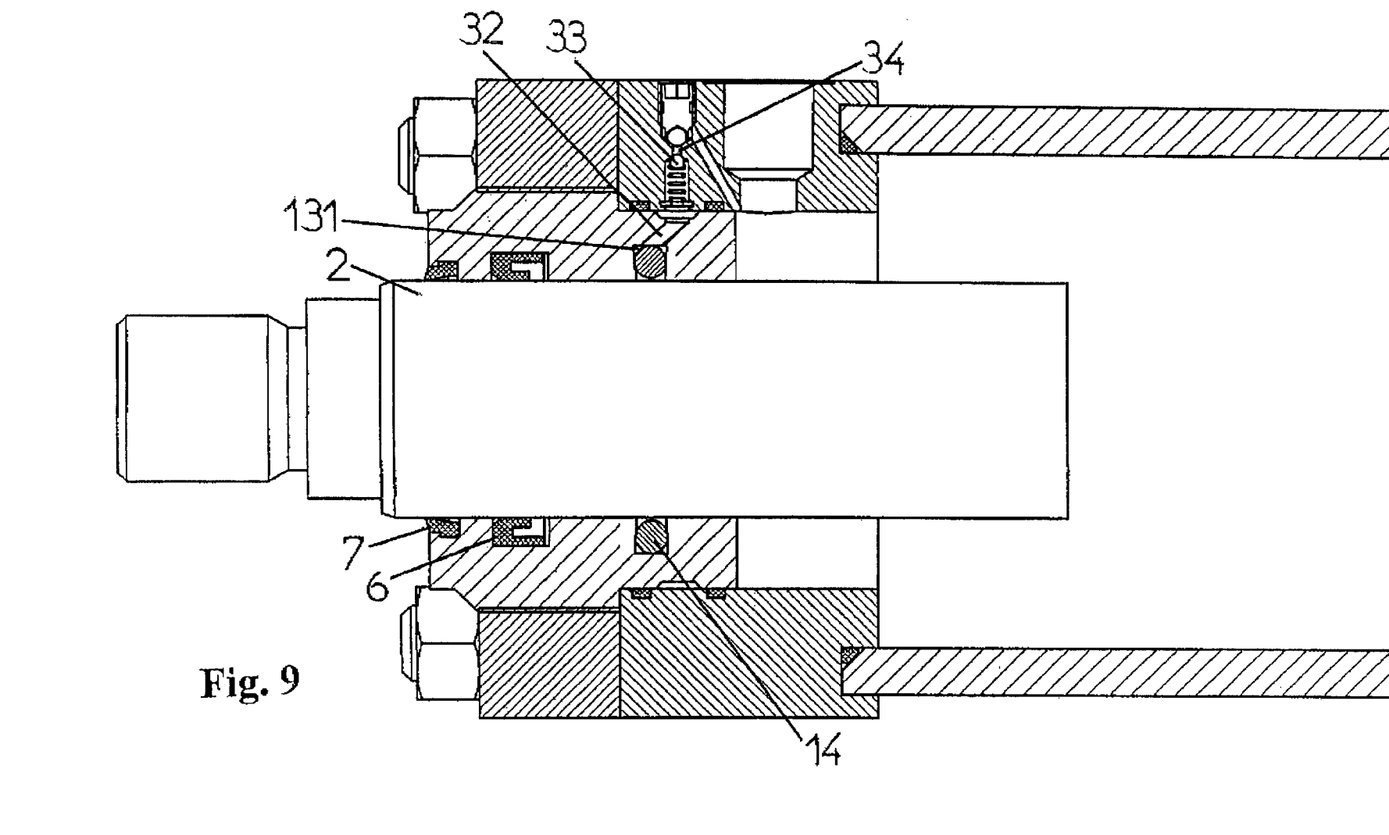
FIG. 9 shows an embodiment with a conical annular groove for the accommodation of a further sealing ring in the standby position.
Figure 10:
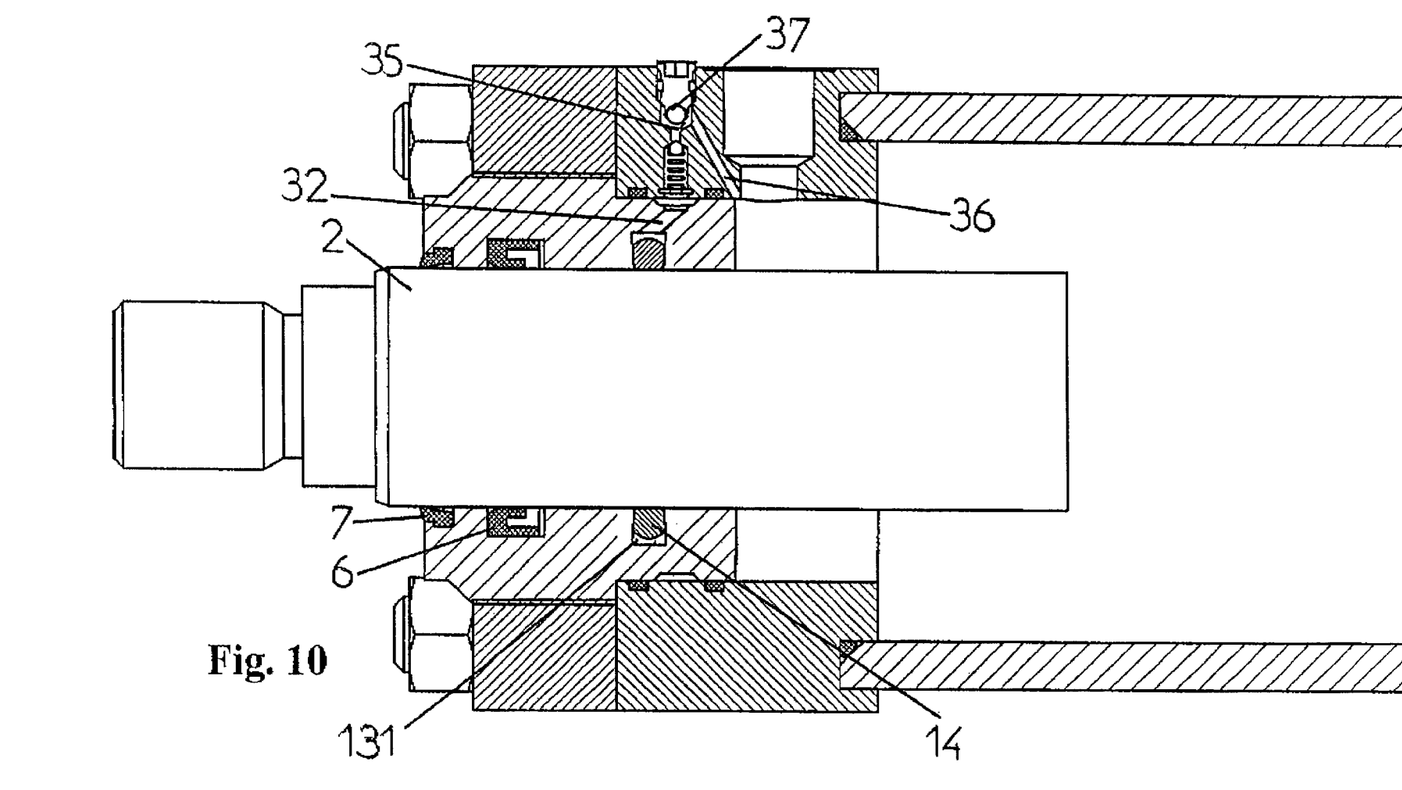
FIG. 10 shows an embodiment as in FIG. 9, but in a functional position with the open shutoff valve.

According to FIG. 9 an additional groove in the shape of a conical annular groove 131 is formed, e.g. by milling, in the area of the piston rod guide 4. This conical annular groove 131 has a width which is smaller at the piston rod near end than the width at the piston rod far end. Thus, the changed surface ratios provide for an adequate compression force of the elastic sealing ring 14 during the pressure build-up.

Figure 11:
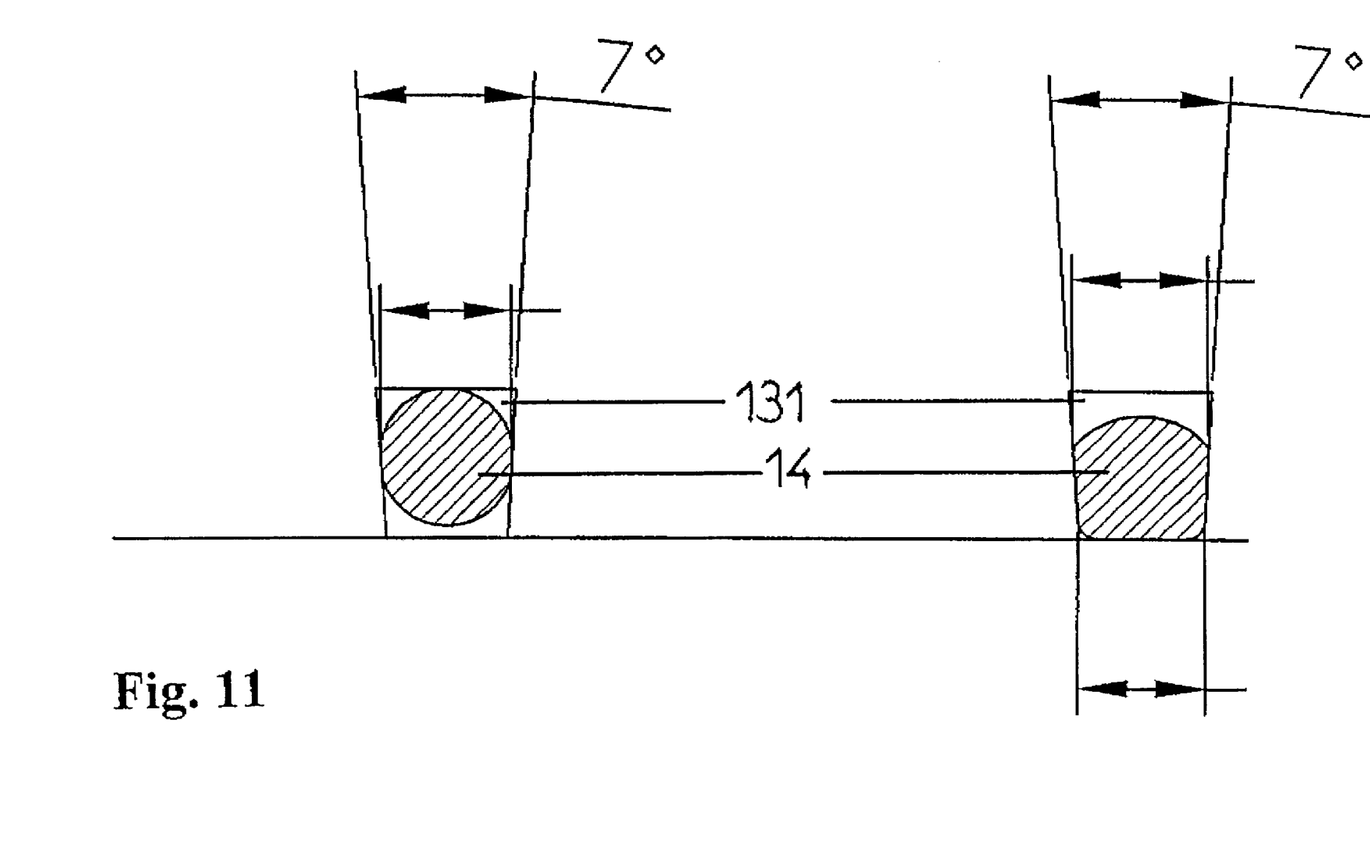
FIG. 11 shows a principal illustration of the conical annular groove with the deformation of the elastic sealing ring as it occurs upon pressure build-up.

The deformation of the elastic sealing ring 14 upon pressure build-up will be understood from FIG. 11.

In the standby position of the further embodiment according to FIG. 9 the elastic sealing ring 14 is in its rest position. The illustration of FIG. 10 shows the function of the elastic sealing ring 14 which is activated in that the shutoff valve 37 is brought into such a position that the feeder 36 to chamber 35 is primed with hydraulic fluid under operating pressure.

With the pressure in the chamber 35 building up, the force of the check valve 33 is overcome, i.e. the chamber opening 34 is cleared. Consequently, the hydraulic fluid keeps flowing into the conical annular groove 131 via the duct 32, whereby a pressure is built up at the rear side of the sealing ring 14, with a force acting in the direction of the piston rod 2 being the consequence. The check valve 33 maintains the desired sealing position of the elastic sealing ring 14 even then when the operating pressure of the hydraulic fluid drops, e.g. during the retraction of the piston. In this embodiment it is not necessary to externally supply a pressure medium, with the shape of the conical annular groove providing for adequate forces with the given pressure conditions.

List of Reference Numerals

1 Piston
2 Piston rod
3 Working cylinder
4 Piston rod guide
5 Annular recesses in the rod guide
6 Elastic sealing rings
7 Oil wiper ring
8 Guide means or guide bands, respectively
9 Screw connection
10 Flange
11 Working chamber
12 Concentric cylinder ring/supporting part
13 Further groove for the accommodation of a further elastic sealing ring
14 Further elastic sealing ring
15 Piston rod surface
16 Screw bolt
17 Threaded hole
18 Stop face for counter pressing
19 Circumferential recess in the rod guide for cylinder ring
20 Mounting piece for the accommodation of a piston rod band
21 Sealable access hole
22 Plug
23 Annular supporting part above rod guide
24 Sealing elements between working cylinder and rod guide or cylinder ring/annular supporting part
25 Annular duct in rod guide
26 Medium supply duct
27 Medium connection
28 Steel spring ring
29 Rest position
30 Press frame
31 Oil reservoir
131 Conical annular groove
32 Duct
33 Check valve
34 Chamber opening
35 Chamber
36 Feeder to Chamber
37 Shutoff valve

What is claimed is:

1. A sealing device for a piston subjected to a pressure medium in a working cylinder, comprising:
    a piston rod guide arranged in or at the working cylinder and said rod guide comprising annular recesses and with first elastic sealing rings and guide means being respectively disposed in the annular recesses;
    at least one groove for accommodation of a second elastic sealing ring formed in the rod guide or in a cylinder ring downstream of a pressure chamber or the working chamber and concentrically surrounding the piston rod; and
    means for application of forces acting on the second elastic sealing ring from outside and radially to the piston rod, if required, so that the second elastic sealing ring moves or deforms from a rest position into a sealing position.

2. The sealing device according to claim 1, wherein the groove is configured as a conical annular groove, with a width of the conical annular groove at a piston rod near end being smaller than a width at a piston rod far end.

3. The sealing device according to claim 2, wherein the conical annular groove communicates with a duct that opens into a chamber comprising a check valve, the check valve sealing a chamber opening under spring load against the outside, the chamber opening extending into a further chamber that can be primed with hydraulic fluid under operating pressure as a pressure medium, and wherein a feeder for priming the chamber with hydraulic fluid can be sealed by a shutoff valve.

4. The sealing device according to claim 1, wherein the cylinder ring is arranged in a circumferential recess in the rod guide and forms a supporting part for the second elastic sealing ring, with the supporting part being adjustable in an axial direction of the piston rod, a groove-shaped recess for the elastic sealing ring provided in the supporting part, with the sealing ring being compressible against a stop face upon an adjustment of the supporting part, thereby urging under deformation against a surface of the piston rod.

5. The sealing device according to claim 4, wherein the stop face is part of a mounting piece for accommodation of one of the piston rod guide bands.

6. The sealing device according to claim 4, wherein the supporting part is adjustable by a screw bolt connection that extends into a cylinder frame or a portion of the working cylinder, with sealable access holes to the screw bolts being formed in the rod guide.

7. The sealing device according to claim 1, wherein the at least one groove is formed as an annular duct in the rod guide or in an annular supporting part above the rod guide and connected with the rod guide, and said annular duct has a depth for complete accommodation of the second sealing ring, with a medium supply duct extending in an essentially radially outward direction from the annular duct, with the medium supply duct having a medium connection at its outer end in order to urge or move, respectively, the second sealing ring located in the annular duct by a fluid medium, if required, from the rest position into the sealing position and vice versa and against a surface of the piston rod.

8. The sealing device according to claim 7, wherein the medium supply duct extends through a cylinder frame of the working cylinder and the medium connection is formed at the cylinder frame or the working cylinder.

9. The sealing device according to claim 1, wherein one of the first elastic sealing rings or the second elastic sealing rings are O-rings.

10. The sealing device according to claim 1, wherein one of the first elastic sealing rings or the second elastic sealing rings comprise a biased steel spring ring, in which bias is overcome by pressure application and the second sealing ring moving and deforming from the rest position into the sealing position.

11. The sealing device according to clam 7, wherein the medium connection carries a gaseous or liquid medium.

12. The sealing device according to claim 1, wherein the cylinder ring or the annular supporting part surrounds the piston rod at a distance and is mounted at or in a frame or a flange portion of the working cylinder together with the rod guide.

13. Application of a device according to claim 1 for a hydraulic piston die press, as an emergency operation and/or repair seal.

14. Application of a device according to claim 1 as an emergency operation seal in a case of leakage of usual primary hydraulic seals.

* * * * *

UNITED STATES PATENT AND TRADEMARK OFFICE
CERTIFICATE OF CORRECTION

PATENT NO.   : 6,658,987 B1
DATED        : December 9, 2003
INVENTOR(S)  : Oberhauser It is certified that error appears in the above-identified patent and that said Letters Patent is hereby corrected as shown below:

Title page,
Item [30], Foreign Application Priority Data, should read:
-- [30]    Foreign Application Priority Data
      May 19, 1999 (DE) ............................... 19922957.0
      Jun. 10, 1999 (DE) ............................... 19926450.3
      Jan. 25, 2000 (DE) ............................... 10003075.0 --

Signed and Sealed this

Eleventh Day of May, 2004

JON W. DUDAS
*Acting Director of the United States Patent and Trademark Office*